United States Patent [19]

Rauch et al.

[11] 3,950,760

[45] Apr. 13, 1976

[54] DEVICE FOR WRITING WITH LIQUID INK

[75] Inventors: Ilse-Dore Stromberger-d'Alton Rauch; Klaus Witter, both of Hamburg, Germany

[73] Assignee: U.S. Philips Corporation, New York, N.Y.

[22] Filed: Dec. 4, 1974

[21] Appl. No.: 529,340

[30] Foreign Application Priority Data

Dec. 12, 1973 Germany............................ 2361781

[52] U.S. Cl................. 346/140 A; 346/141; 310/8.5

[51] Int. Cl.$^{2}$.......................................... G01D 15/16

[58] Field of Search .............. 346/140, 141; 310/8.5

[56] References Cited

UNITED STATES PATENTS

| | | | |
|---|---|---|---|
| 1,895,727 | 1/1933 | Pearce | 346/140 A |
| 2,841,722 | 7/1958 | Grauley | 310/8.5 |
| 3,108,673 | 10/1963 | Green | 197/1 |
| 3,418,427 | 12/1968 | Jones | 178/30 |

*Primary Examiner*—Joseph W. Hartary
*Attorney, Agent, or Firm*—Frank R. Trifari

[57] ABSTRACT

A writing device for writing with liquid ink in which the transfer of the ink to the record carrier is electrically controlled having a piezoceramic beam provided with electrodes on the surface thereof and formed with ducts which extends longitudinally to accommodate electrodes and/or ink. A writing stylus is secured to the end face thereof.

5 Claims, 12 Drawing Figures

DEVICE FOR WRITING WITH LIQUID INK

The invention relates to a writing device for writing with a liquid ink in which the transfer of the ink to the record carrier is electrically controlled.

Several devices are known in which deflected jets of droplets are used for recording. The ink droplets are produced by fine-bore nozzles with the use of pressure or a high voltage. Because in this manner continuous trains of droplets only are produced, each individual droplet has to be charged by special electrodes and selected and deflected in vertical electric field. The advantage of such a method of controlling which consumes substantially no energy and has substantially no inertia will be clear. Unfortunately, however, the deflectibility of the individual drops is restricted within narrow limits owing to the aerodynamic and electrostatic interactions between successive drops, so that even with the use of a plurality of expensive control means the quality of such recordings remains unsatisfactory. Additional problems arise from the likelihood of the fine-bore nozzles becoming clogged and from the use of a high pressure or voltage.

To avoid the difficulties associated with deflection several systems using parallel arranged nozzles have been proposed. The main disadvantage of such arrangements is the large consumption of ink, because in continuous drop production as a rule only a fraction can actually be used for recording. Hence special attention must be paid to arrangements using discontinuous drop production, see for example German Offenlegungsschriften 2,164,614, 2,161,529 and 2,161,315. The arrangements described mainly comprise liquid supply chambers on which piezoceramic plates can exert pressure and which are provided with suitable supply and discharge ducts and by proper shaping are adapted to produce a pumping effect on a plurality of nozzles. Apart from the difficulties which arise in respect of the construction of the complicated flow ducts and of correct coupling of the piezoceramic bending oscillator to the liquid, such a device is extremely susceptible to clogging of the nozzles and ducts and also to air bubbles in the writing liquid.

It is an object of the present invention to simplify the transport and transfer of the writing liquid.

According to the invention this is achieved in that the device comprises a flexible beam which is made of a piezoelectric material and which is provided with electrodes on its surface and is formed with ducts which extend in the direction of length of the beam and serve to accommodate electrodes and/or ink, a writing stylus being secured to the end face of the beam.

In contradistinction to the known mechanical printing and writing devices no substantial force is to be transmitted and the production of drops may even be dispensed with, the bending oscillation of the beam being directly utilized.

Figure 1A:
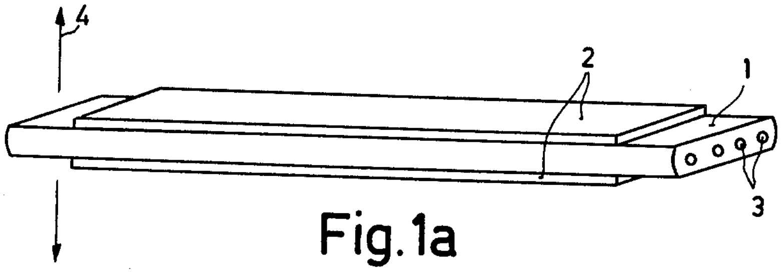
Figure 1B:
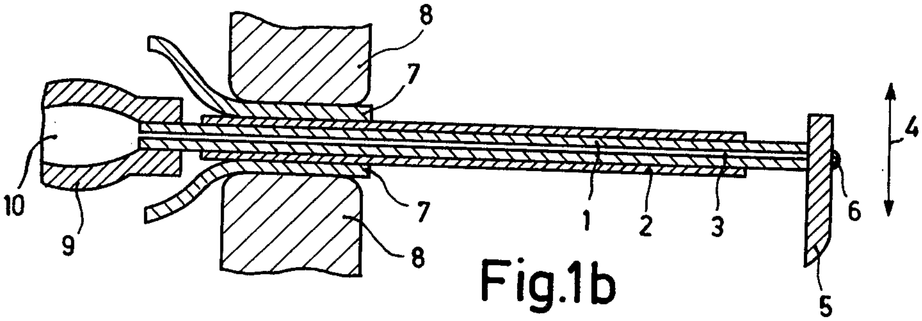
Figure 1C:
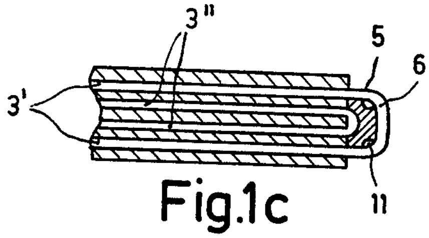
Figure 1D:
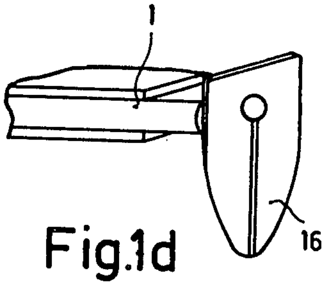
Figure 2A:
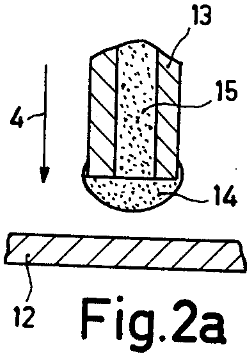
Figure 2B:
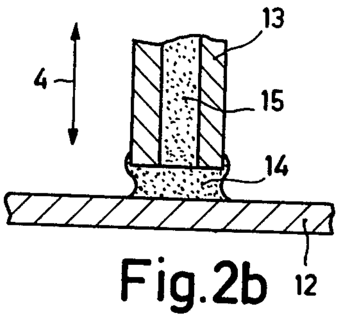
Figure 2C:
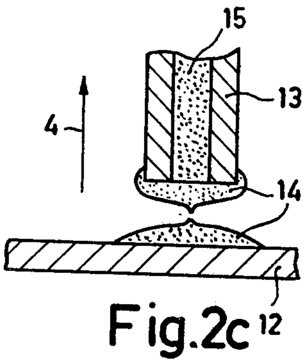
Figure 3A:
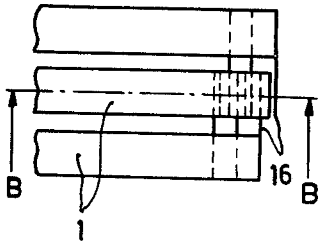
Figure 3B:
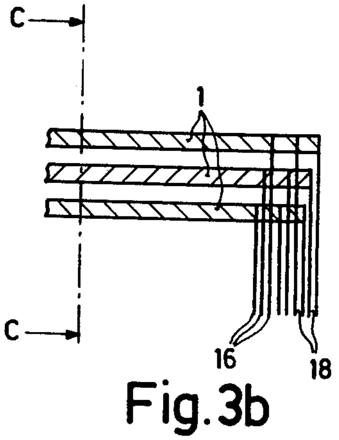
Figure 3C:
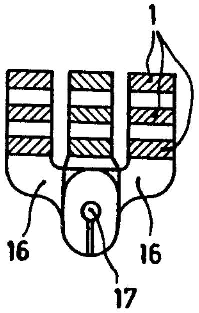
Figure 4A:
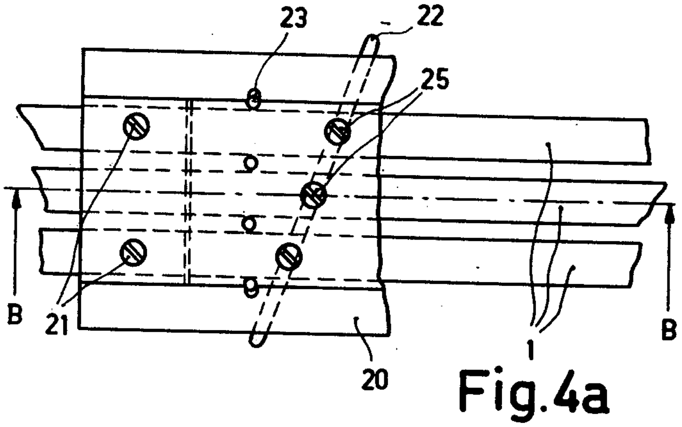
Figure 4B:
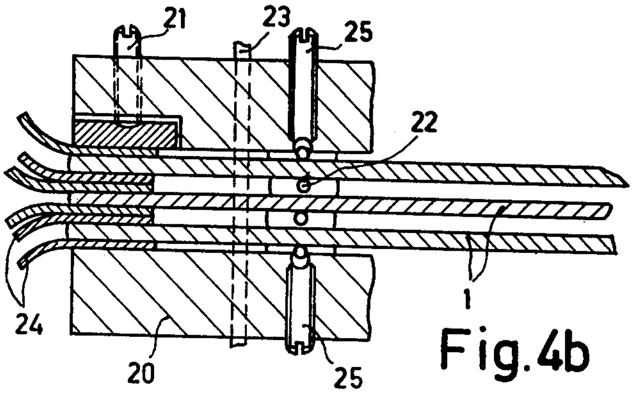

Embodiments of the invention will now be described, by way of example, with reference to the accompanying diagrammatic drawings, in which FIG. 1*a* shows schematically a piezoelectric bending element, FIG. 1*b* is a sectional view of a piezoelectric beam for a device according to the invention, FIG. 1*c* is a broken away sectional view taken through a plane at a right angle to the plane of FIG. 1*b* of a detail of the beam, FIG. 1*d* is a pictorial representation of a writing stylus, in accordance with another form of the invention, FIGS. 2*a*, 2*b*, and 2*c* are simplified sectional views showing the process of ink transfer, FIG. 3*a* is a plan view of a multiple beam construction, FIG. 3*b* is a longitudinal sectional view of the beam shown in FIG. 3*a*, FIG. 3*c* is a cross-sectional view taken through a plane at right angles to the plane of FIG. 3*b*, FIG. 4*a* is a plan view of a holder for the multiple beam, and FIG. 4*b* is a schematic longitudinal sectional view of the holder shown in FIG. 4*a*.

Referring now to FIG. 1*a*, 1*b*, 1*c* and 1*d*, there is shown a bending element in the form of a beam 1 which is made of a piezoelectric material and is of a type as used, for example, for playing disk records. The beam comprises regions of material which are oppositely polarized and are largely separated by longitudinal ducts 3 for accommodating electrodes, and outer electrodes 2 in the form of thin metal coatings. The dimension at right angles to a direction of bending 4 is made several times larger than that extending in the direction of bending 4 in order to avoid undesirable transverse oscillations.

FIG. 1*b* is a longitudinal sectional view of a piezoelectric beam 1 which at one end together with electric connecting leads 7 connected to the electrodes 2 is clamped between two insulated holders 8. The two inner ones of the four ducts 3 are connected to an ink supply container, not shown, by a hose 9. A writing stylus 5 is secured by means of a metal wire 6 to the free end of the piezooscillator. The wire 6 may pass through the two outer ducts 3' (see FIG. 1*c*) to the clamped end of the oscillator where it may be used as an electric connection. A bending element which, for example, is 0.7 mm thick and has a free length of 15 mm permits of obtaining transverse oscillation amplitudes in the direction of the arrow 4 of 0.2 mm at frequencies up to 1 kHz. Because the oscillating mass mainly consists of the active piezoelectric ceramic material, even without special precautions being taken damping is sufficient to convert any sequence of electric signals into a corresponding mechanical movement as long as the mechanical resonant frequency is not exceeded. The described method of supplying the ink or writing liquid avoids oscillation complications; in addition, the normally high electrical conductivity of the ink provides an effective central electrode. FIG. 1*c* illustrates the manner of securing the stylus 5, which is shown in cross-section. The ink supplied by the central ducts 3'' is conveyed through capillary slits 11 to the lower end of the stylus 5 at which it is to be transferred to the record carrier. Obviously capillary tubes or pen-shaped devices such, for example, as designated by 16 in FIG. 1*d* may be used in place of writing stylus 5.

FIGS. 2*a*, 2*b* and 2*c* serve to illustrate the transfer of the liquid: in the inoperative position a capillary tube 13 filled with ink 15 is spaced by about 0.2 mm from the upper surface of a record carrier or paper 12 (which consists for example of normal conventional paper 0.1 mm thick). When ink is supplied a globule 14 which has convex meniscus is formed in which the surface tension should not be overcome (FIG. 2*a*). By means of the bending element the tube 13 is moved closer to paper 12 in the direction indicated by the arrow 4 through a distance such that the meniscus contacts the record carrier 12 (FIG. 2*b*). With a recording material which is wettable and absorptive, such contact is sufficient to transfer an adequate amount of liquid. On the return movement of the tube in the direction indicated by the arrow 4 the globule 14 separates as shown in FIG. 2*c*.

To form characters from dots according to a matrix, suitably writing elements such as shown in FIG. 1*b* are arrayed in a number equal to the number of columns arranged in radial or parallel configuration. However, because the transverse dimension of the bending element as a rule will exceed the desirable spacing between the dots, preferably a staggered arrangement is used as shown in FIG. 3*a* (in plan view) and in FIGS. 3*b* and 3*c* (in sectional views). For the purpose of ink transfer flat strips 16 in the form of pens as shown in FIG. 1*d* are secured to the end faces of the bending elements 1, the detailed features of which are shown in FIG. 3*c*. The ink may be supplied through the bending elements in the manner shown in FIG. 1*b*, however, because each pair of strips 16 at their lower ends forms a fine capillary slit, the provision of an external ink supply, not shown, at the location of bores 17 may ensure that all interstices 18 (FIG. 3*b*) are filled with ink. Thus transverse oscillations of the strips 16 are prevented and oscillation damping is effectively increased. Furthermore there is substantially no likelihood of clogging.

The bending elements or beams 1 are secured in a holder 20 in the manner shown in FIGS. 4*a* and 4*b* by means of a clamping device 21, contact strips 24 and spacers 22 and 23. To enable the bending elements 1 to be individually excited, the contact strips 24 are parts of flexible twosided printed circuits. The spacers 22 and 23 may take the form of tubes or filaments made of a resilient synthetic material. Because after assembly of the bending elements 1 as a rule the tips of the pens 16 will have to be adjusted to be equally spaced from the record carrier, set screws 25 are provided. The screws are staggered so that the free lengths of the bending oscillators will be approximately equal. For fine adjustment of the writing tips electric means may be provided which apply a suitable direct-voltage component to each bending element.

What is claimed is:

1. A device for writing with liquid ink in which the transfer of the ink to the record carrier is electrically controlled, characterized in that the device comprises an elongated flexible beam having a major axis extending in the direction of elongation, said beam including a piezoelectric element and electrodes, said element being made of a piezoelectric material having at least two regions oppositely polarized, said regions being disposed to bend said beam in a direction transverse to the major axis of said beam responsive to an associated electric potential applied to said electrodes, said beam further including electrodes being disposed on the surface of said element, said element including walls defining a plurality of ducts which extend in the longitudinal direction of the beam, said device including a writing stylus being secured to the end face of the beam, said stylus including means for conveying liquid ink, said means being in fluid communication with at least one of said ducts.

2. A device as claimed in claim 1, wherein said means includes at least one capillary slit for taking up and delivering the ink supplied through the ducts.

3. A device as claimed in claim 1, wherein said writing stylus is generally planar.

4. A device as claimed in, claim 1 further including a plurality of additional beams of incremental lengths, each beam being disposed in aligned relationship to each other beam, each beam carrying a plurality of staggered flat pens.

5. A device as claimed in claim 4, further including a holder for said beams which includes means for adjusting each of said means longitudinally both individually and collectively.

* * * * *